US011405093B2

(12) United States Patent
Huang et al.

(10) Patent No.: US 11,405,093 B2
(45) Date of Patent: Aug. 2, 2022

(54) WIRELESS DEVICE, BEAM RECOVERY METHOD AND WIRELESS SYSTEM

(71) Applicant: Wistron NeWeb Corporation, Hsinchu (TW)

(72) Inventors: Yung-Liang Huang, Hsinchu (TW); Wen-Jiun Lin, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 243 days.

(21) Appl. No.: 16/831,814

(22) Filed: Mar. 27, 2020

(65) Prior Publication Data
US 2020/0328798 A1    Oct. 15, 2020

(30) Foreign Application Priority Data
Apr. 12, 2019 (TW) ................. 108112791

(51) Int. Cl.
*H04B 7/08* (2006.01)
*H04W 72/04* (2009.01)
*H04W 16/28* (2009.01)
*H04B 17/336* (2015.01)

(52) U.S. Cl.
CPC .......... *H04B 7/088* (2013.01); *H04B 17/336* (2015.01); *H04W 16/28* (2013.01); *H04W 72/046* (2013.01)

(58) Field of Classification Search
CPC .. H04B 7/088; H04B 17/336; H04B 7/15528; H04B 17/24; H04B 7/0617; H04W 16/28; H04W 72/046
See application file for complete search history.

(56) References Cited

U.S. PATENT DOCUMENTS

| | | | | |
|---|---|---|---|---|
| 6,421,526 B1* | 7/2002 | Banno | .................... | H01Q 21/28 455/12.1 |
| 2005/0202859 A1* | 9/2005 | Johnson | ............... | H04B 7/0408 455/575.7 |
| 2008/0002627 A1* | 1/2008 | Cha | ........................ | H04L 1/1887 370/334 |
| 2012/0052828 A1* | 3/2012 | Kamel | ................. | H04B 17/104 455/226.2 |
| 2014/0055302 A1* | 2/2014 | Jia | ........................ | H04B 7/0632 342/372 |
| 2016/0191201 A1* | 6/2016 | Park | ..................... | H04B 7/0639 370/252 |
| 2017/0223667 A1* | 8/2017 | Yl | ............................ | H04L 5/14 |
| 2017/0303265 A1* | 10/2017 | Islam | ................... | H04B 7/0617 |
| 2018/0310283 A1* | 10/2018 | Deenoo | ................ | H04L 5/0048 |
| 2019/0045414 A1* | 2/2019 | Guerreiro | ............ | H04B 7/0695 |
| 2019/0081687 A1* | 3/2019 | Sadiq | .................. | H04B 7/0695 |

(Continued)

*Primary Examiner* — Ivan O Latorre
(74) *Attorney, Agent, or Firm* — Winston Hsu

(57) ABSTRACT

A wireless device comprises a transceiving circuit, configured to receive a plurality of beam performance parameters corresponding to a plurality beams; a storage circuit, configured to store a table, wherein corresponding relationships between the plurality beams and the plurality of beam performance parameters are tabulated in the table; and a processing circuit, configured to perform the following steps: selecting a first beam according to the table; determining whether a first beam performance value corresponding to the first beam is less than a threshold; and selecting a second beam according to the table when the first beam performance value is less than the threshold.

20 Claims, 4 Drawing Sheets

(56) References Cited

U.S. PATENT DOCUMENTS

| | | | |
|---|---|---|---|
| 2019/0319682 A1* | 10/2019 | Zhang | H04B 7/0417 |
| 2020/0084798 A1* | 3/2020 | Peisa | H04W 72/046 |
| 2020/0220603 A1* | 7/2020 | Hao | H04B 7/063 |
| 2020/0305041 A1* | 9/2020 | Fan | H04W 36/30 |
| 2020/0313748 A1* | 10/2020 | Padhy | H04B 7/088 |
| 2021/0242982 A1* | 8/2021 | Stauffer | H04W 68/02 |

* cited by examiner

WIRELESS DEVICE, BEAM RECOVERY METHOD AND WIRELESS SYSTEM

BACKGROUND OF THE INVENTION

1. Field of the Invention

The present invention relates to a wireless device, a beam recovery method and a wireless system, and more particularly, to a wireless device, a beam recovery method and a wireless system capable of avoiding radio link failure.

2. Description of the Prior Art

The $5^{th}$ generation wireless communication (5G) uses high frequency bands up to tens of GHz, e.g., the frequency band n257 (26.5-29.5 GHz), the frequency band n261 (27.5-28.35 GHz), n260 (37-40 GHz), which are much higher than the current 4G system. The 5G system can provide high transmission rate, achieves nearly 40 times of the 4G networks, and the delay is very low. However, the diffraction ability (i.e. bypassing obstacles) of the 5G signal is limited, and the transmission distance of the 5G signal is short, which requires more stations to increase coverage.

In addition, the 5G system can transmit signals using millimeter wave (Millimeter Wave, mmWave). Because wavelength of the millimeter wave is short, the stations (e.g., gNodeB) can be equipped with multiple antennas to form beams with narrow beamwidth. Due to the narrow beamwidth, the 5G system is sensitive to the azimuth angle (e.g., Direction/Angle of Arrival (DoA/AoA)), and easily leads to radio link failure (RLF), such that the end-to-end performance is degraded.

Therefore, how to avoid radio link failure is a significant objective in the field.

SUMMARY OF THE INVENTION

It is therefore a primary objective of the present invention to provide a wireless device, a beam recovery method and a wireless system capable of avoiding radio link failure, to improve over disadvantages of the prior art.

An embodiment of the present invention discloses a wireless device, comprising a transceiving circuit, configured to receive a plurality of beam performance parameters corresponding to a plurality of beams, wherein the plurality of beam performance parameters is generated by a user device; a storage circuit, configured to store a table, the table stores a relationship between the plurality of beams and the plurality of beam performance parameters; and a processing circuit, configured to perform the following steps: selecting a first beam according to the table, wherein the wireless device utilizes the first beam to perform data transmission; determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmission.

An embodiment of the present invention further discloses a beam recovery method, applied in a wireless device. The beam recovery method comprises receiving a plurality of beam performance parameters corresponding to a plurality of beams, wherein the plurality of beam performance parameters is generated by a user device; forming a table according to a relationship between the plurality of beams and the plurality of beam performance parameters, and store the table in a storage circuit of the wireless device; selecting a first beam according to the table, wherein the wireless device utilizes the first beam to perform data transmission; determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmission.

An embodiment of the present invention further discloses a wireless system, comprising a wireless device, comprises a transceiving circuit, configured to receive a plurality of beam performance parameters corresponding to a plurality of beams; a storage circuit, configured to store a table, wherein the table stores a relationship between the plurality of beams and the plurality of beam performance parameters; and a processing circuit, configured to perform the following steps: selecting a first beam according to the table, wherein the wireless device utilizes the first beam to perform data transmission; determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmission; and a user device, configured to generate the plurality of beam performance parameters, and send the plurality of beam performance parameters to the wireless device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
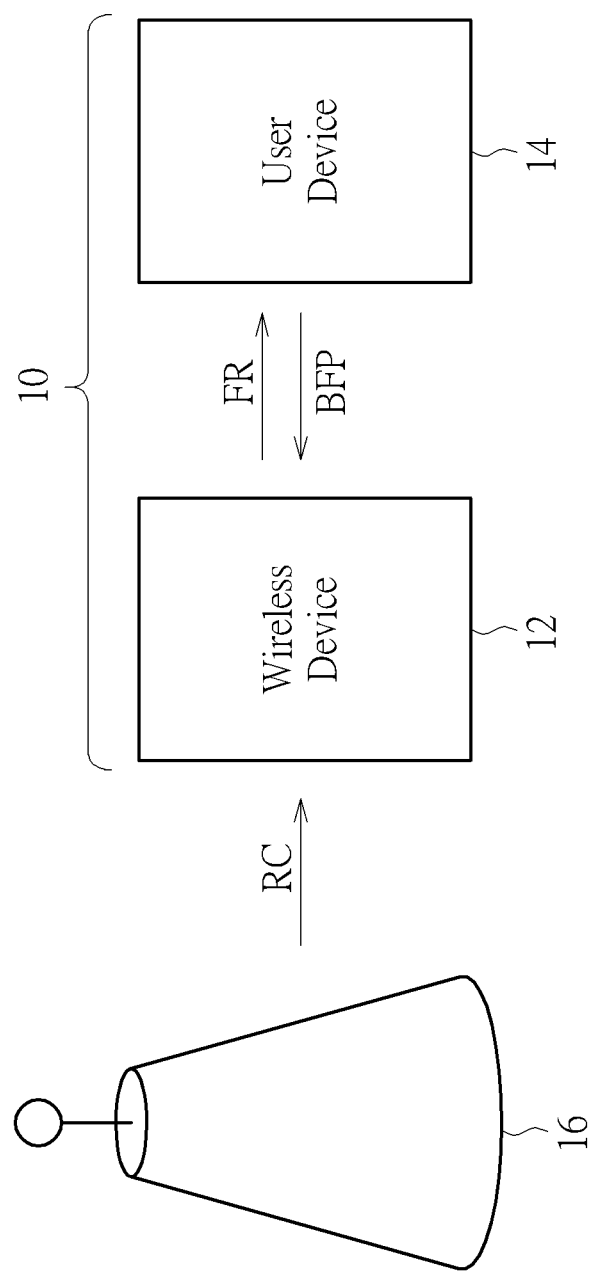
FIG. 1 is a schematic diagram of a wireless system according to an embodiment of the present invention.
Figure 2:
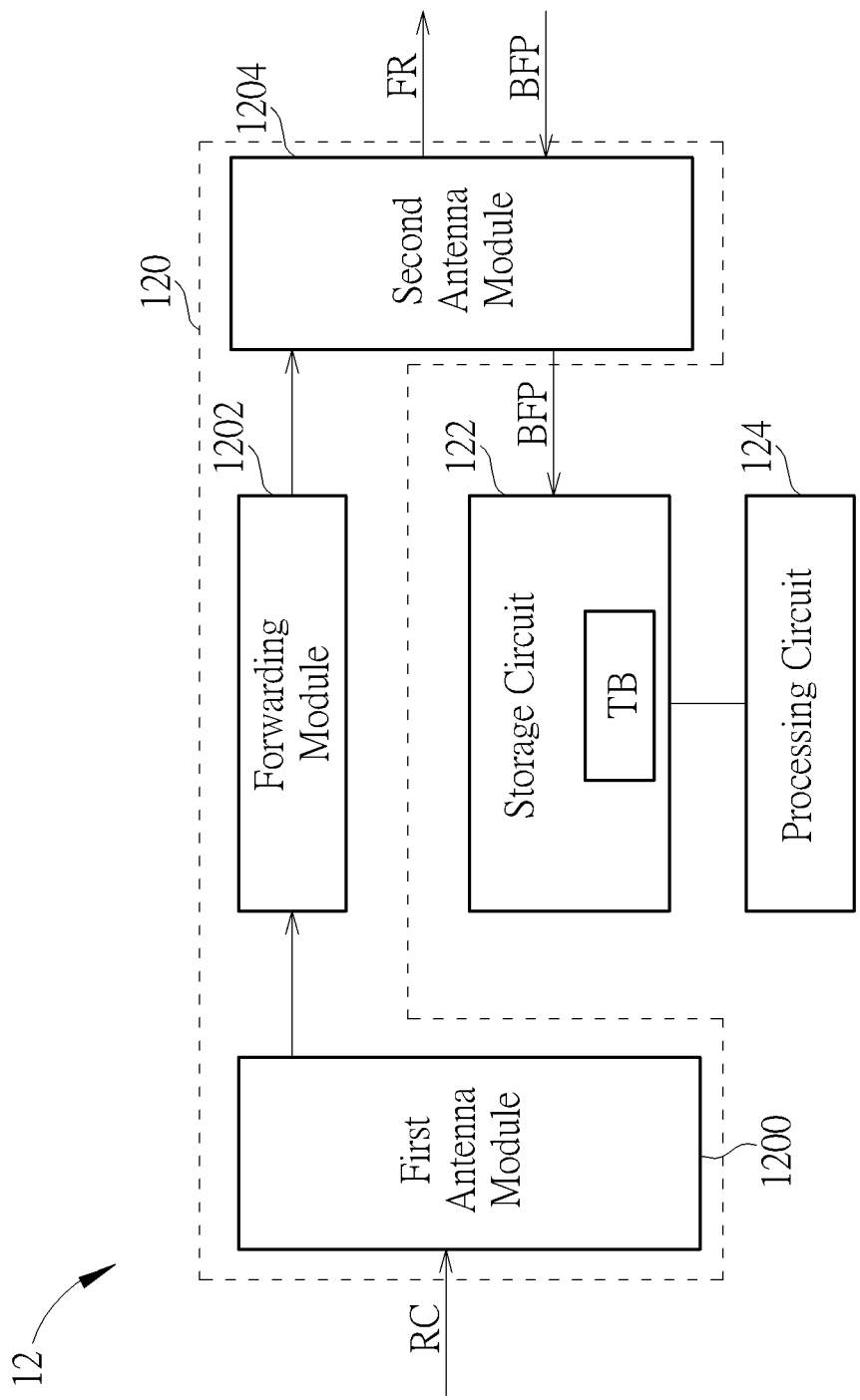
FIG. 2 is a schematic diagram of a wireless device according to an embodiment of the present invention.

FIG. 1 is a schematic diagram of a wireless system 10 according to an embodiment of the present invention. FIG. 2 is a schematic diagram of a wireless device 12 according to an embodiment of the present invention. The wireless system 10 comprises the wireless device 12 and a user device 14. The wireless device 12 may receive a received signal RC from a station 16, and forwards the received signal RC to the user device 14. In other words, the wireless device 12 may generate a forward signal FR according to the received signal RC, and send the forward signal FR to the user device 14. The station 16 may be a 5G station, i.e., the station 16 may be a gNodeB (abbreviated as gNB), which may emit millimeter wave (mmWave). The user device 14 may be a phone, a tablet computer, a laptop computer, a wireless router, etc. The wireless device 12 may be a wireless repeater, also known as wireless range extender. Moreover, the received signal RC or the forward signal FR may be transmitted via a plurality of beams BF. The user device 14 may perform signal processing operation (e.g., demodulation) on the forward signal FR, to generate a plurality of beam performance parameters BFP corresponding to the plurality of beams BF and send the plurality of beam performance parameters BFP back to the wireless device 12. The wireless device 12 may form a table TB storing a relationship between the plurality of beams BF and the plurality of beam performance parameters BFP, and select an appropriate beam BF to perform data transmission according to the table TB, in order to solve/bypass the problem of radio link failure (RLF), and to enhance an end-to-end performance.

Specifically, the wireless device 12 comprises a transceiving circuit 120, a storage circuit 122 and a processing circuit 124. The storage circuit 122 may be a random access memory (RAM) or an electrically erasable programmable read only memory (EEPROM), which is not limited thereto. The processing circuit 124 may be a microcontroller (MCU) or a processor, which is not limited thereto. The transceiving circuit 120 comprises a first antenna module 1200, a forwarding module 1202 and a second antenna module 1204.

The first antenna module 1200 may be a millimeter wave antenna module, configured to perform data transmission with the station 16, e.g., to receive the received signal RC from the station 16. The second antenna module 1204 is configured to perform data transmission with the user device 14, e.g., to forward the forward signal FR to the user device 14 and to receive the plurality of beam performance parameters BFP from the user device 14. The forwarding module 1202 is configured to generate the forward signal FR according to the received signal RC. In an embodiment, the forwarding module 1202 may generate the forward signal FR in an amplify-and-forward manner. That is, the forwarding module 1202 multiples the received signal RC received by the first antenna module 1200 by a specific gain g to generate the forward signal FR, i.e., FR=g·RC. In an embodiment, the forwarding module 1202 may comprise an amplifier.

After the user device 14 receives the forward signal FR from the wireless device 12, the user device 14 may generate the plurality of beam performance parameters BFP corresponding to the plurality of beams BF, wherein the beam performance parameter BFP(s) may be at least one of a throughput ThP, a reference signal received power (RSRP), a reference signal receiving quality (RSRQ) and a signal to interference plus noise ratio (SINR), which is not limited thereto. Moreover, the throughput may be referred to a downlink (DL) throughput or an uplink (UL) throughput, RSRP may be SS-RSRP (Synchronization Signal RSRP) or CSI-RSRP (Channel State Information RSRP), RSRQ may be SS-RSRQ (Synchronization Signal RSRQ) or CSI-RSRQ (Channel State Information RSRQ), and SINR may be SS-SINR (Synchronization Signal SINR) or CSI-SINR (Channel State Information SINR).

The plurality of beams BF may be beams formed between the (at least a) station 16 and the wireless device 12. In an embodiment, the plurality of beams BF may be transmission beams formed from the station 16 toward the wireless device 12, and the received signal RC is transmitted from the (at least a) station 16 via the plurality of beams BF to the first antenna module 1200.

Figure 3:
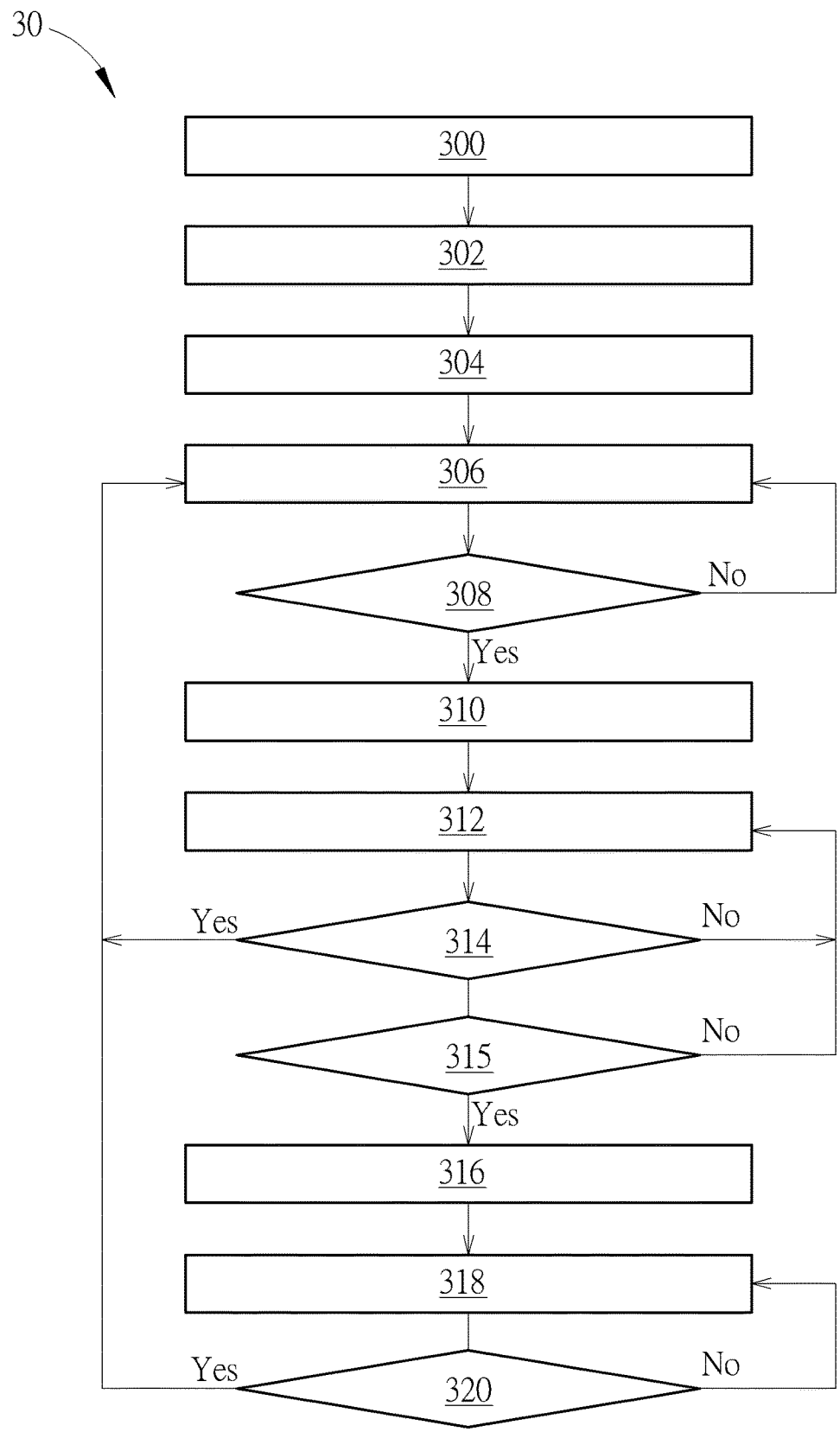
FIG. 3 is a schematic diagram of a beam recovery process according to an embodiment of the present invention.

The wireless device 12 may execute a beam recovery process, to select the appropriate beam BF according to the table TB to avoid RLF. Please refer to FIG. 3. FIG. 3 is a schematic diagram of a beam recovery process 30 according to an embodiment of the present invention. The beam recovery process 30 comprises the following steps:

Step 300: Receive a plurality of beam performance parameters corresponding to a plurality of beams, wherein the plurality of beam performance parameters is generated by a user device.

Step 302: Form a table according to a relationship between the plurality of beams and the plurality of beam performance parameters, and store the table in a storage circuit of the wireless device.

Step 304: Select a first beam according to the table.

Step 306: The wireless device utilizes the first beam to perform data transmission.

Step 308: Determine whether a first beam performance value corresponding to the first beam is less than a threshold value, wherein the first beam performance value is related to at least a first beam performance parameter corresponding to the first beam. If yes, go to Step 310; otherwise, go to Step 306.

Step 310: Select a second beam according to the table.

Step 312: The wireless device switches to the second beam to perform data transmission.

Step 314: Determine whether the first beam performance value corresponding to the first beam is greater than the threshold value. If yes, go to Step 306; otherwise, go to Step 312.

Step 315: Determine whether a second beam performance value corresponding to the second beam is less than the threshold value, wherein the second beam performance value is related to at least a second beam performance parameter corresponding to the second beam. If yes, go to Step 316; otherwise, go to Step 312.

Step 316: Select a third beam according to the table.

Step 318: The wireless device switches to the third beam to perform data transmission.

Step 320: Determine whether the first beam performance value corresponding to the first beam is greater than the threshold value. If yes, go to Step 306; otherwise, go to Step 318.

In Step 300, the transceiving circuit 120 of the wireless device 12 receives the plurality of beam performance parameters BFP which is generated by the user device 14 and corresponding to the plurality of beams BF.

In Step 302, the wireless device 12 may form the relationship between the plurality of beams BF and the plurality of beam performance parameters BFP as the table TB, and store the table TB in the storage circuit 122. The format of the table TB may be referred to TABLE I as follows. As shown in TABLE I, the table TB tabulates the relationship between beams $BF_1$-$BF_M$ and the beam performance parameters $BFP_1$-$BFP_M$. For example, the beam performance parameter $BFP_m$ corresponding to the beam $BF_m$ may comprise a throughput $ThP_m$, a reference signal received power $RSRP_m$, a reference signal receiving quality $RSRQ_m$ and a signal to interference plus noise ratio $SINR_m$ (as shown in TABLE I). Or, the beam performance parameter $BFP_m$ may be at least one of the throughput $ThP_m$, the reference signal received power $RSRP_m$, the reference signal receiving quality $RSRQ_m$, and the signal to interference plus noise ratio $SINR_m$. In addition, Steps 300 and 302 may be regarded as a beam scan operation on the plurality of beams BF.

TABLE I

| (TB) | | | | | |
|---|---|---|---|---|---|
| | BFP | | | | |
| | ThP | RSRP | RSRQ | SINR | BF_IND |
| $BF_1$ | $ThP_1$ | $RSRP_1$ | $RSRQ_1$ | $SINR_1$ | $BF\_IND_1$ |
| $BF_2$ | $ThP_2$ | $RSRP_2$ | $RSRQ_2$ | $SINR_2$ | $BF\_IND_2$ |
| $BF_3$ | $ThP_3$ | $RSRP_3$ | $RSRQ_3$ | $SINR_3$ | $BF\_IND_3$ |
| ... | | | | | |
| $BF_M$ | $ThP_M$ | $RSRP_M$ | $RSRQ_M$ | $SINR_M$ | $BF\_IND_M$ |

In Step 304, the first beam is selected according to the table TB. Specifically, the processing circuit 124 may read the storage circuit 122, and obtain beam performance indices $BF\_IND_1$-$BF\_IND_M$ corresponding to the beams $BF_1$-$BF_M$ according to the beam performance parameters $BFP_1$-$BFP_M$. The beam performance index $BF\_IND_m$ is a comprehensive performance index corresponding to the beam $BF_m$, which can be computed and obtained by combining the throughput $ThP_m$, the reference signal received power $RSRP_m$, the reference signal receiving quality $RSRQ_m$, and the signal to interference plus noise ratio $SINR_m$. For example, the processing circuit 124 may compute the beam performance index $BF\_IND_m$ corresponding to the beam $BF_m$ as $BF\_IND_m = a \cdot ThP_m + b \cdot RSRP_m + c \cdot RSRQ_m + d \cdot SINR_m$, which is not limited thereto. The beam performance indices $BF\_IND_1$-$BF\_IND_M$ may be also stored in the table TB. In addition, the beam performance indices $BF\_IND_1$-$BF\_IND_M$ may be computed by the processing circuit 124 or by the user device 14.

The processing circuit 124 may further perform a sorting operation on the beam performance indices $BF\_IND_1$-$BF\_IND_M$, so as to form a beam performance index series $\{BF\_IND_{(1)}, \ldots, BF\_IND_{(M)}\}$. The beam performance indices $BF\_IND_{(1)}$-$BF\_IND_{(M)}$ represent the beam performance indices after sorting, where $BF\_IND_{(1)} > BF\_IND_{(2)} > \ldots > BF\_IND_{(M)}$. In an embodiment, the processing circuit 124 may select the beam $BF_{(1)}$ corresponding to the beam performance index $BF\_IND_{(1)}$ (at a time $t_1$), and the beam $BF_{(1)}$ is the first beam referred by Step 304.

In Step 306, the wireless device 12 may utilize the beam $BF_{(1)}$ to perform the data transmission between the station 16 and the user device 14. For example, when the plurality of beams BF are transmission beams formed from the station 16 toward the wireless device 12, the wireless device 12 may receive data transmitted from/by the station 16 via the beam $BF_{(1)}$.

Nevertheless, under the condition of "the operating frequency band of the station 16 is 20-30 GHz" and "the beamwidth of the beams $BF_1$-$BF_M$ is narrow", it is possible that the signal path of the beam $BF_{(1)}$ may be blocked by obstacle(s) and RLF occurs.

To avoid RLF, the processing circuit 124 may monitor a beam performance value $BFV_{(1)}$ of the beam $BF_{(1)}$ (during a time interval $T_1$ in which the wireless device 12 uses the beam $BF_{(1)}$ to perform the data transmission). Once the processing circuit 124 (at a time $t_2$) finds that the beam performance value $BFV_{(1)}$ of the beam $BF_{(1)}$ is less than a threshold value ThD, the wireless device 12 may switch to the beam $BF_{(k)}$ (starting from the time $t_2$) to perform the data transmission between the station 16 and the user device 14.

In other words, in Step 308, the processing circuit 124 determines whether a first beam performance value (e.g., the beam performance value $BFV_{(1)}$) corresponding to the first beam (e.g., the beam $BF_{(1)}$) is less than the threshold value ThD. The beam performance value $BFV_{(1)}$ may be one beam performance parameter of the beam performance parameter $BFP_{(1)}$ corresponding to the beam $BF_{(1)}$. For example, the beam performance value $BFV_{(1)}$ may be one of the throughput $ThP_{(1)}$, the reference signal received power $RSRP_{(1)}$, the reference signal receiving quality $RSRQ_{(1)}$, the signal to interference plus noise ratio $SINR_{(1)}$. Or, the beam performance value $BFV_{(1)}$ may be the beam performance index $BF\_IND_{(1)}$. In short, the beam performance value $BFV_{(1)}$ is related to the beam performance parameter $BFP_{(1)}$ corresponding to the beam $BF_{(1)}$.

In Step 310, the processing circuit 124 selects a second beam according to the table TB. The processing circuit 124 may select the beam $BF_{(k)}$ corresponding to the beam performance index $BF\_IND_{(k)}$ according to the beam performance index series $\{BF\_IND_{(1)}, \ldots, BF\_IND_{(M)}\}$ (which is formed according to the table TB), and the beam $BF_{(k)}$ is the second beam referred by Step 310.

In an embodiment, the processing circuit 124 may directly select the second beam as the beam $BF_{(2)}$ (k=2) according to the beam performance index series $\{BF\_IND_{(1)}, \ldots, BF\_IND_{(M)}\}$. At this time, the beam performance index $BF\_IND_{(k)}$ is a second maximum within the beam performance index series $\{BF\_IND_{(1)}, \ldots, BF\_IND_{(M)}\}$, i.e., $BF\_IND_{(2)}$, or equivalently, $BF\_IND_{(k)} = BF\_IND_{(2)}$.

In an embodiment, the processing circuit 124 may sequentially determine which one of the beams $BF_{(2)}, \ldots, BF_{(M)}$ can be the appropriate second beam according to the beam performance index series $\{BF\_IND_{(1)}, \ldots, BF\_IND_{(M)}\}$. For example, the processing circuit 124 may temporarily select the beam $BF_{(2)}$ first, and determine whether a beam performance value $BFV_{(2)}$ corresponding to the beam $BF_{(2)}$ is greater than a specific value (e.g., the threshold value ThD). If not, the processing circuit 124 may proceed to select the beam $BF_{(3)}$, determine whether a beam performance value $BFV_{(3)}$ corresponding to the beam $BF_{(3)}$ is greater than the specific value, and so on. The processing circuit 124 may find one beam performance value $BFV_{(k)}$ corresponding to the beam $BF_{(k)}$ is greater than the specific value, and the processing circuit 124 may select the beam $BF_{(k)}$ as the second beam at this time.

In Step 312, the wireless device 12 may switch to using the second beam (the beam $BF_{(k)}$) to perform the data transmission between the station 16 and the user device 14.

When the wireless device 12 utilizes the second beam (e.g., the beam $BF_{(k)}$) to perform the data transmission between the station 16 and the user device 14, in Step 314, the processing circuit 124 determines whether the beam performance value (e.g., the beam performance value $BFV_{(1)}$) corresponding to the first beam (e.g., the beam $BF_{(1)}$) is greater than the threshold value ThD. Take the first beam being the beam $BF_{(1)}$ as an example, Step 314 is to revisit the beam performance value $BFV_{(1)}$ of the beam $BF_{(1)}$ to see/check if it is back to a connectable status (a status in which the beam performance value is good enough to successfully establish a connection via the beam $B_{(1)}$). If the beam performance value $BFV_{(1)}$ is back to the connectable status, the wireless device 12 may switch back to utilizing the beam $BF_{(1)}$ to perform the data transmission between the station 16 and the user device 14 (which is to perform Step 306). If the beam performance value $BFV_{(1)}$ is still not back to the connectable status, the wireless device 12 may keep use the second beam (e.g., the beam $BF_{(k)}$) to perform the data transmission between the station 16 and the user device 14 (which is to perform Step 312).

In Step 315, the processing circuit 124 determines whether the second beam performance value (e.g., the beam performance value $BFV_{(k)}$) corresponding to the second beam (e.g., the beam $BF_{(k)}$) is less than the threshold value ThD. If yes, the processing circuit 124 selects the third beam (e.g., the beam $BF_{(j)}$) according to the table TB, which is to perform Step 316 (by the processing circuit 124). In an embodiment, the third beam (e.g., the beam $BF_{(j)}$) may be a beam BF among the plurality of beams BF except the first beam (e.g., the beam $BF_{(1)}$) and the second beam (e.g., the beam $BF_{(k)}$).

Steps 318 and 320 are similar to Steps 312 and 314, which are narrated herein for brevity.

Notably, using the beam $BF_{(k)}$ to perform the data transmission is an alternative to avoid the RLF caused by the signal path of the beam $BF_{(1)}$ being blocked by the obstacle thereon. When the obstacle is removed, the wireless device 12 should/may switch back to the beam $BF_{(1)}$ to perform the data transmission, or select other beam BF (which is better than the beam $BF_{(1)}$) to perform the data transmission.

Figure 4:
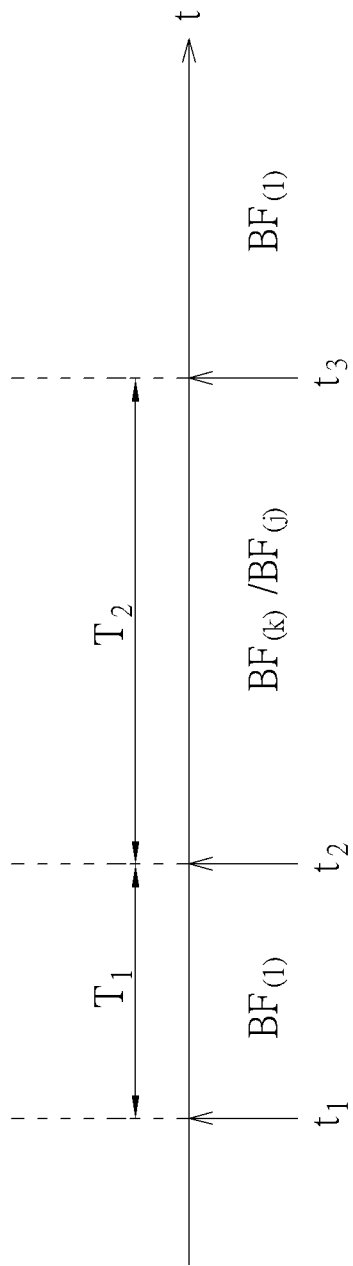
FIG. 4 is a schematic diagram of a plurality of times and a plurality of time intervals according to an embodiment of the present invention.

In other words, the wireless device 12 uses the second beam or the third beam to perform data transmission, e.g., the wireless device 12 uses the beam $BF_{(k)}$ or the beam $BF_{(j)}$ to perform the data transmission during a time interval $T_2$. The processing circuit 124 may keep monitoring the beam performance value $BFV_{(1)}$ of the beam $BF_{(1)}$ to see if it is greater than the threshold value ThD (i.e., Step 314). When the processing circuit 124 finds that the beam performance value $BFV_{(1)}$ of the beam $BF_{(1)}$ is greater than the threshold value ThD (at a time $t_3$), it represents that the obstacle on the signal path of beam $BF_{(1)}$ may have already been removed, the wireless device 12 may re-select the beam $BF_{(1)}$ (starting from the time $t_3$), so as to switch back to using the beam $BF_{(1)}$ to perform the data transmission between the station 16 and the user device 14. The inter-relationship between the times $t_1$, $t_2$, $t_3$ and the time intervals $T_1$, $T_2$ is illustrated in FIG. 4.

In an embodiment, the processing circuit 124 may record the time in which the wireless device 12 utilizes the second beam or the third beam to perform the data transmission. For example, when the time in which the wireless device 12 utilizes the second beam (the beam $BF_{(k)}$) to perform the data transmission is longer than a time $T_{OUT1}$ and the time in which the wireless device 12 utilizes the third beam (the beam $BF_{(j)}$) to perform the data transmission is longer than a time $T_{OUT2}$, if the beam performance value (e.g., the beam performance value $BFV_{(1)}$) corresponding to the first beam (e.g., the beam $BF_{(1)}$) is still less than the threshold value ThD at this time, the wireless device 12 would again perform beam scan operation, i.e., the wireless device 12 would re-execute Steps 300 and 302, or re-execute the beam recovery process 30.

Re-executing Steps 300 and 302 may allow the wireless device 12 to receive beam signal from different stations with good signal quality. For example, the wireless device 12 may execute Steps 300 and 302 at a first time. At the first time, there might be an obstacle between the wireless device 12 and a station A, and the wireless device 12 may mainly receive the beam signal from another station B. While the wireless device 12 executing Steps 300 and 302 at the first time, the wireless device 12 may obtain the table TB1 corresponding to the first time. As time goes, when the wireless device 12 executes Steps 300 and 302 at a second time, the obstacle between the wireless device 12 and a station A may have been removed, the table TB2 is obtained by executing Steps 300 and 302 by the wireless device 12 at the second time, and the table TB2 must be different from the table TB1. Furthermore, the wireless device 12 may update the table TB periodically or aperiodically, which is to execute Steps 300 and 302 periodically or aperiodically.

The wireless device 12 may exploit the beam performance parameter BFP provided by the user device 14 to form the table TB. The wireless device 12 may adaptively switch to another beam $BF_{(k)}$, according to the table TB, to perform the data transmission, when there is obstacle(s) on the signal path of the beam $BF_{(1)}$. After the obstacle is removed, the wireless device 12 may switch back to the beam $BF_{(1)}$ to perform the data transmission. Therefore, the RLF caused by poor diffraction capability of the millimeter wave or the narrow beamwidth can be avoided.

Notably, the wireless device 12 does not have to generate the beam performance parameter BFP by itself, but obtain the beam performance parameter BFP by exploiting/utilizing the demodulation (or signal processing) capability of the user device 14. Thus, production cost of the wireless device 12 can be reduced.

In another perspective, the plurality of beams BF is not limited to be the beams formed between the at least a station 16 and the wireless device 12. The plurality of beams BF may also be the beams formed between the wireless device 12 and the user device 14. In an embodiment, the plurality of beams BF may be the beams formed from the wireless device 12/the second antenna module 1204 toward the user device 14, and the forward signal FR may be transmitted from the wireless device 12/the second antenna module 1204 via the plurality of beams BF to the user device 14.

In summary, the wireless device of the embodiment of the present invention may utilize the beam performance parameters provided by the user device to the table and store the table in the storage circuit. When there is an obstacle on the signal of the first beam, the wireless device may adaptively switch to the second beam (other than the first beam) to perform the data transmission. After the obstacle is removed, the wireless device may switch back to the first beam (or switch to the third beam) to perform the data transmission. Therefore, the RLF caused by poor diffraction capability of the millimeter wave or the narrow beamwidth can be avoided, and the end-to-end performance can be enhanced. In addition, the wireless device of the present invention does not require demodulation (or signal processing) capability, and production cost thereof can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless device, comprising:
a transceiving circuit, configured to receive a plurality of beam performance parameters corresponding to a plurality of beams, wherein the plurality of beam performance parameters is generated by a user device;
a storage circuit, configured to store a table, wherein the table stores a relationship between the plurality of beams and the plurality of beam performance parameters; and
a processing circuit, configured to perform the following steps:
selecting a first beam according to the table, wherein the wireless device utilizes the first beam to perform data transmission;
determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmission;

wherein the processing circuit further performs the following steps:

determining whether the first beam performance value corresponding to the first beam is greater than the threshold value when the wireless device utilizes the second beam to perform data transmission; and re-selecting the first beam when the first beam performance value is greater than the threshold value, wherein the wireless device switches to the first beam to perform data transmission.

2. The wireless device of claim 1, wherein the processing circuit performs the following steps, to select the first beam according to the table:

obtaining a plurality of beam performance indices corresponding to the plurality of beams according to the plurality of beam performance parameters;

performing a sorting operation on the plurality of beam performance indices, to form a beam performance index series; and selecting the first beam according to the beam performance index series, wherein a first beam performance index corresponding to the first beam is a maximum among the plurality of beam performance indices.

3. The wireless device of claim 2, wherein the processing circuit performs the following steps, to select the second beam according to the table:

selecting the second beam according to the beam performance index series, wherein a second beam performance index corresponding to the second beam is less than the maximum among the plurality of beam performance indices.

4. The wireless device of claim 3, wherein the second beam performance index is a second maximum among the beam performance index series.

5. The wireless device of claim 1, wherein the processing circuit further performs the following steps:

determining whether a second beam performance value corresponding to the second beam is less than the threshold value; and selecting a third beam according to the table when the second beam performance value is less than the threshold value, wherein the wireless device switches to the third beam to perform data transmission.

6. The wireless device of claim 5, wherein the processing circuit further performs the following steps:

determining whether the first beam performance value corresponding to the first beam is greater than the threshold value when the wireless device utilizes the third beam to perform data transmission; and re-selecting the first beam when the first beam performance value is greater than the threshold value, wherein the wireless device switches to the first beam to perform data transmission.

7. The wireless device of claim 1, wherein the transceiving circuit comprises:

a first antenna module, configured to receive a received signal;

a forwarding module, configured to generate a forward signal according to the received signal; and a second antenna module, configured to forward the forward signal to the user device.

8. The wireless device of claim 7, wherein the plurality of beams is formed between at least a station and the wireless device, the received signal is transmitted via the plurality of beams to the first antenna module, the user device generates the plurality of beam performance parameters corresponding to the plurality of beams according to the forward signal and sends the plurality of beam performance parameters back to the wireless device, and the second antenna module receives the plurality of beam performance parameters corresponding to the plurality of beams.

9. The wireless device of claim 7, wherein the plurality of beams is formed between the wireless device and the user device, the forward signal is transmitted by the second antenna module via the plurality of beams to the user device, the user device generates the plurality of beam performance parameters corresponding to the plurality of beams according to the forward signal and sends the plurality of beam performance parameters back to the wireless device, and the second antenna module receives the plurality of beam performance parameters corresponding to the plurality of beams.

10. The wireless device of claim 7, wherein the first antenna module is a millimeter wave (mmWave) antenna module.

11. The wireless device of claim 1, wherein the at least a first beam performance parameter corresponding to the first beam is at least one of a throughput, a reference signal receiving quality (RSRQ) and a signal to interference plus noise ratio (SINK) corresponding to the first beam.

12. A beam recovery method, applied in a wireless device, the beam recovery method comprising:

receiving a plurality of beam performance parameters corresponding to a plurality of beams, wherein the plurality of beam performance parameters is generated by a user device;

forming a table according to a relationship between the plurality of beams and the plurality of beam performance parameters, and store the table in a storage circuit of the wireless device;

selecting a first beam according to the table, wherein the wireless device utilizes the first beam to perform data transmission;

determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmissions;

wherein the beam recovery method further comprises:

determining whether the first beam performance value corresponding to the first beam is greater than the threshold value when the wireless device utilizes the second beam to perform data transmission; and re-selecting the first beam when the first beam performance value is greater than the threshold value, wherein the wireless device switches to the first beam to perform data transmission.

13. The beam recovery method of claim 12, wherein the step of selecting the first beam according to the table comprises:

obtaining a plurality of beam performance indices corresponding to the plurality of beams according to the plurality of beam performance parameters;

performing a sorting operation on the plurality of beam performance indices, to form a beam performance index series; and selecting the first beam according to the beam performance index series, wherein a first beam performance index corresponding to the first beam is a maximum among the plurality of beam performance indices.

14. The beam recovery method of claim 13, wherein the step of selecting the second beam according to the table comprises:

selecting the second beam according to the beam performance index series, wherein a second beam performance index corresponding to the second beam is less than the maximum among the plurality of beam performance indices.

15. The beam recovery method of claim 14, wherein the second beam performance index is a second maximum among the beam performance index series.

16. The beam recovery method of claim 12, further comprising:

determining whether a second beam performance value corresponding to the second beam is less than the threshold value; and selecting a third beam according to the table when the second beam performance value is less than the threshold value, wherein the wireless device switches to the third beam to perform data transmission.

17. The beam recovery method of claim 16, further comprising:

determining whether the first beam performance value corresponding to the first beam is greater than the threshold value when the wireless device utilizes the third beam to perform data transmission; and re-selecting the first beam when the first beam performance value is greater than the threshold value, wherein the wireless device switches to the first beam to perform data transmission.

18. A wireless system, comprising:

a wireless device, comprising:

a transceiving circuit, configured to receive a plurality of beam performance parameters corresponding to a plurality of beams;

a storage circuit, configured to store a table, wherein the table stores a relationship between the plurality of beams and the plurality of beam performance parameters; and a processing circuit, configured to perform the following steps:

selecting a first beam according to the table, wherein the wireless device utilizes the first beam to perform data transmission;

determining whether a first beam performance value corresponding to the first beam is less than a threshold value, wherein the first beam performance value is related to at least a first beam performance parameter corresponding to the first beam; and selecting a second beam according to the table when the first beam performance value is less than the threshold value, wherein the wireless device switches to the second beam to perform data transmission; and a user device, configured to generate the plurality of beam performance parameters, and send the plurality of beam performance parameters to the wireless device;

wherein the processing circuit further performs the following steps:

determining whether the first beam performance value corresponding to the first beam is greater than the threshold value when the wireless device utilizes the second beam to perform data transmission; and re-selecting the first beam when the first beam performance value is greater than the threshold value, wherein the wireless device switches to the first beam to perform data transmission.

19. The wireless system of claim 18, wherein the transceiving circuit receives a received signal from at least a station, the received signal is transmitted via the plurality of beams to the transceiving circuit; the wireless device generates a forward signal according to the received signal and forwards the forward signal to the user device; the user device generates the plurality of beam performance parameters corresponding to the plurality of beams according to the forward signal and sends the plurality of beam performance parameters back to the wireless device; and the plurality of beams is formed between the at least a station and the wireless device.

20. The wireless system of claim 18, wherein the plurality of beams is formed between the wireless device and the user device, the wireless device sends a forward signal to the user device, and the user device generates the plurality of beam performance parameters corresponding to the plurality of beams according to the forward signal and sends the plurality of beam performance parameters back to the wireless device.

* * * * *